H. MOORE.
PLOW.
APPLICATION FILED APR. 30, 1909.

943,092.

Patented Dec. 14, 1909.

Witnesses
Walter Troemel.
Thomas W. McMeans

Inventor
Henry Moore.
By Bradford Hood
Attorneys

UNITED STATES PATENT OFFICE.

HENRY MOORE, OF INDIANAPOLIS, INDIANA.

PLOW.

943,092.  Specification of Letters Patent.  Patented Dec. 14, 1909.

Application filed April 30, 1909. Serial No. 493,153.

*To all whom it may concern:*

Be it known that I, HENRY MOORE, a citizen of the United States, residing at Indianapolis, in the county of Marion and State of Indiana, have invented certain new and useful Improvements in Plows, of which the following is a specification.

It has long been recognized that the present usual method of tilling the ground is not of a character to produce the best crop results and this is especially true where the total rain fall is not much more than sufficient, even if it is all retained, to supply the plant life.

The object of my present invention is to provide a mechanism by means of which there may be produced, at any desired depth, preferably greater than the ordinary plowing depth, a stratum of earth which has been broken up; a second stratum which has been removed from the exposed surface of the ground, broken up, turned, and deposited upon the first stratum, and compacted; and a third stratum which has been withdrawn from a point below the exposed surface of the ground and turned and deposited on top of the other two strata, thus producing a condition of soil wherein the seed may be planted in a compacted stratum of comparatively fine earth having no detrimental voids and having below it a well broken up stratum which will permit ready drainage but, at the same time, will permit the capillary delivery of water to the crop roots from the undisturbed ground beneath.

Figure 1:
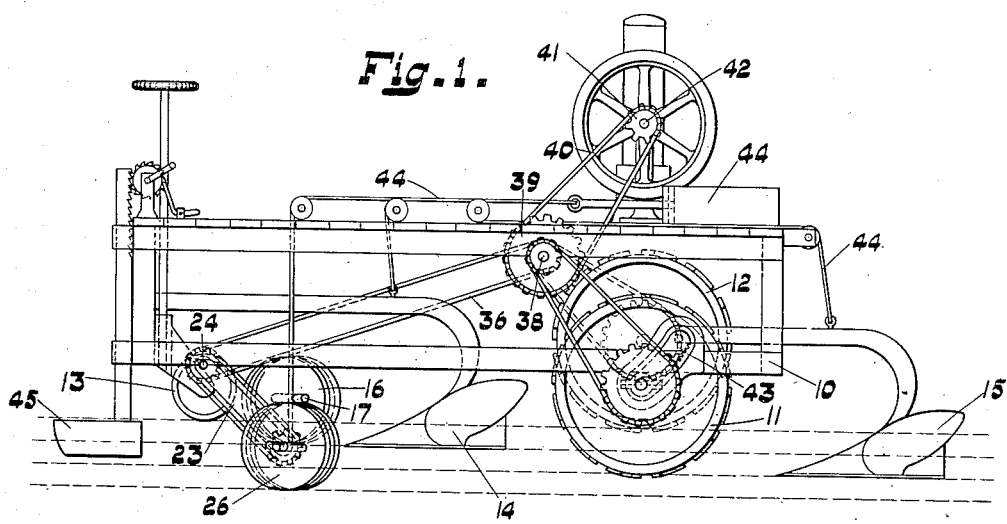
Figure 2:
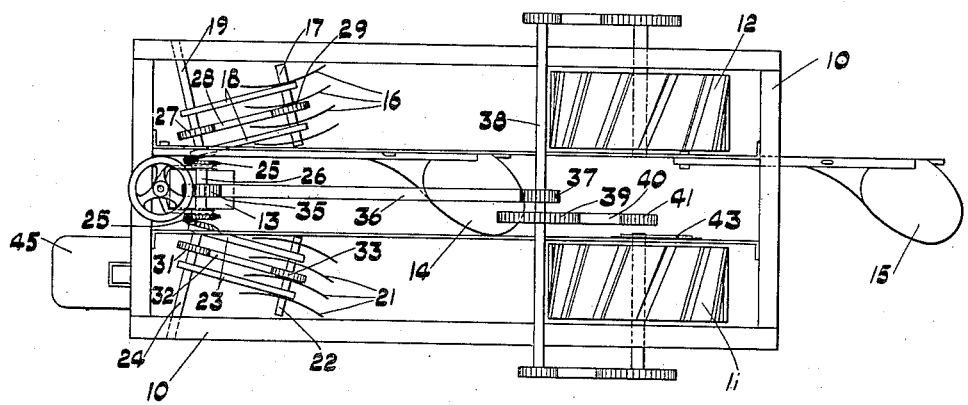
Figure 3:
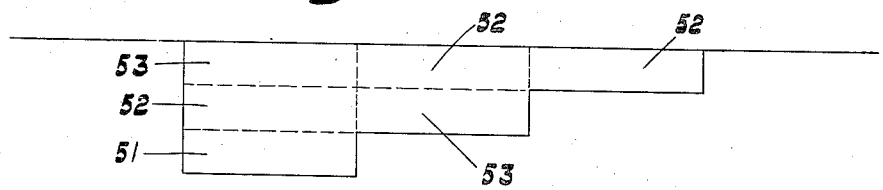

The accompanying drawings illustrate an embodiment of my invention:

Figure 1 is a side elevation; Fig. 2 a plan, and Fig. 3 a vertical section of ground treated with my machine.

In the drawings, 10 indicates a suitable frame which is supported at its rear end by two wheels 11 and 12 and at its front end by a suitable steering or caster wheel 13. Suitably mounted in frame 10 are two plows 14 and 15, the plow 15 being immediately to the rear of plow 14 and arranged to plow in the bottom of the furrow of the plow 14.

Arranged at the front end of frame 10, upon the land side of plow 14, is a series of cultivator disks 16 which are mounted upon a rotary shaft 17 journaled in suitable arms 18 pivotally swung upon a shaft 19 mounted in suitable journals on the frame 10, said shaft 19 lying at less than a right angle to the line of draft. Arranged upon the furrow side of the plows, in the line of displacement of said plows, but in balanced relationship to the cultivator disks 16, are similar cultivator disks 21 which are carried by a rotary shaft 22 journaled in the outer ends of arms 23 which are pivotally hung upon a shaft 24 journaled in suitable bearings upon the main frame. The two shafts 19 and 24 are connected by suitable gears 25 with a driving shaft 26 journaled on the main frame. Shaft 19 carries a sprocket wheel 27 which is connected by a sprocket chain 28 with a sprocket wheel 29 carried by shaft 17. Similarly shaft 24 carries a sprocket wheel 31 which is connected by a sprocket chain 32 with a sprocket wheel 33 carried by shaft 22. Shaft 26 is provided with a sprocket wheel 35 which is connected by a sprocket chain 36 with a gear 37 carried within countershaft 38 journaled on the main frame 10 and connected by a gear 39 and chain 40 with a gear 41 carried by a main drive shaft 42 connected to a suitable motor (which may be conveniently a gas engine) 43 mounted on the main frame 10. If desired the apparatus may be self propelled by connecting the two supporting wheels 11 and 12 with the countershaft 38. Wheel 11 is vertically adjustable in guides 43 in order that frame 10 may be properly leveled during transportation, or during the production of the first and subsequent furrows.

It is necessary, in order that the apparatus may turn corners, and be transported from field to field, that the plows and cultivator disks be vertically movable in order that they may be withdrawn wholly from engagement with the ground and for that purpose any desirable elevating mechanism 44 may be provided. A guide shoe 45 may be provided at the forward end of the machine to run in the furrow and serve as a guide.

The operation is as follows:—The first time around the field the cultivator disks 21 will be held up out of operative position and there will be produced a deep furrow, the result of the combined action of the two plows 14 and 15, and on the land side of this furrow the ground will be thoroughly broken up by the cultivators 16 to a depth of about 4", this broken-up surface earth being somewhat compacted, however, by the wheel 12 which rolls upon it. In order to permit this first operation of the machine the carrying wheel 11 will be in the upper end of its guides so as to properly support the machine.

As soon as a complete circuit of the field has been made, wheel 11 will come into the deep furrow which has just been produced and consequently the wheel will be thrown down to a position to support the main frame properly. The cultivator disks 21 will then be thrown down to operative position in the bottom of the furrow. On the second round the disks 21 will thoroughly loosen the sub-soil in the bottom of the deep furrow to a depth of about 4 inches more or less, as shown at 51; the plow 14 will cut and turn over on to the loosened sub-soil in the bottom of the furrow, the previously loosened and somewhat compacted upper surface layer 52 which has been previously operated upon by the disks 16; wheel 11 will thereupon roll upon and compact the two strata 51 and 52, and following this, plow 15 will cut and turn over on to these compacted strata an intermediate roughly broken stratum 53.

I claim as my invention:

1. The combination, with means for breaking up the surface of the ground, of a plow transversely displacing said broken-up surface stratum, means for breaking up the sub-soil in the bottom of a preceding plow furrow preceding the delivery thereupon of the broken-up surface stratum, and means for compacting the surface stratum before turning, and means for compacting the two strata after the surface stratum has been turned.

2. The combination, with means for breaking up the surface of the ground, of a plow transversely displacing and overturning said broken-up surface stratum, means for breaking up the sub-soil in the bottom of a preceding plow furrow preceding the delivery thereupon of the broken-up and overturned surface stratum, and means for compacting the surface stratum before turning, and means for compacting the two strata after the surface stratum has been turned.

3. The combination, with means for breaking up the surface of the ground, of a plow transversely displacing said broken-up surface stratum, means for breaking up the sub-soil in the bottom of a preceding plow furrow preceding the delivery thereupon of the broken-up surface stratum, and a second plow arranged to deliver an intermediate stratum upon the preceding strata.

4. The combination, with means for breaking up the surface of the ground, of a plow transversely displacing and overturning said broken-up surface stratum, means for breaking up the sub-soil in the bottom of a preceding plow furrow preceding the delivery thereupon of the broken-up and overturned surface stratum, and a second plow arranged to deliver an intermediate stratum upon the preceding strata.

5. The combination, with means for breaking up the surface of the ground, of a plow transversely displacing said broken-up surface stratum, means for breaking up the sub-soil in the bottom of a preceding plow furrow preceding the delivery thereupon of the broken-up surface stratum, means for compacting the two strata, and a second plow arranged to deliver an intermediate stratum upon the preceding strata.

6. The combination, with means for breaking up the surface of the ground, of a plow transversely displacing and overturning said broken-up surface stratum, means for breaking up the sub-soil in the bottom of a preceding plow furrow preceding the delivery thereupon of the broken-up and overturned surface stratum, means for compacting the two strata, and a second plow arranged to deliver an intermediate stratum upon the preceding strata.

7. The combination, with a suitable carrying structure, of a plow, a set of cultivator disks arranged in advance of the plow, a second set of cultivator disks arranged upon the furrow side of the plow to break up the sub-soil in the bottom of the furrow preceding delivery thereupon of material from the plow, and means for positively rotating the cultivator disks.

8. The combination, with a suitable carrying structure, of a plow, a set of cultivator disks arranged in advance of the plow, a second set of cultivator disks arranged upon the furrow side of the plow to break up the sub-soil, in the bottom of the furrow preceding delivery thereupon of material from the plow, and a second plow arranged to deliver an intermediate stratum upon the stratum delivered by the first plow upon the broken up sub-soil.

9. The combination, with a suitable carrying structure, of a plow, a set of cultivator disks arranged in advance of the plow, a second set of cultivator disks arranged upon the furrow side of the plow to break up the sub-soil, in the bottom of the furrow preceding delivery thereupon of material from the plow, a second plow arranged to deliver an intermediate stratum upon the stratum delivered by the first plow upon the broken-up sub-soil, and means interposed between the two plows for compacting the two lower strata.

10. The combination, with a suitable carrying structure, of a plow, a set of cultivator disks arranged in advance of the plow, a second set of cultivator disks arranged upon the furrow side of the plow to break up the sub-soil in the bottom of the furrow preceding delivery thereupon of material from the plow, means for positively rotating the cultivator disks, and a second plow arranged to deliver an intermediate stratum upon the stratum delivered by the first plow upon the broken up sub-soil.

11. The combination, with a suitable carrying structure, of a plow, a set of cultivator disks arranged in advance of the plow, a second set of cultivator disks arranged upon the furrow side of the plow to break up the sub-soil in the bottom of the furrow preceding delivery thereupon of material from the plow, means for positively rotating the cultivator disks, a second plow arranged to deliver an intermediate stratum upon the stratum delivered by the first plow upon the broken-up sub-soil, and means interposed between the two plows for compacting the two lower strata.

In witness whereof, I have hereunto set my hand and seal at Indianapolis, Indiana, this twenty-seventh day of April, A. D. one thousand nine hundred and nine.

HENRY MOORE. [L. S.]

Witnesses:
ARTHUR M. HOOD,
THOMAS W. MCMEANS.